No. 662,955. Patented Dec. 4, 1900.
G. E. McCLELLAND.
HOSE ATTACHMENT FOR STOPPING FLOW.
(Application filed Apr. 16, 1900.)
(No Model.)
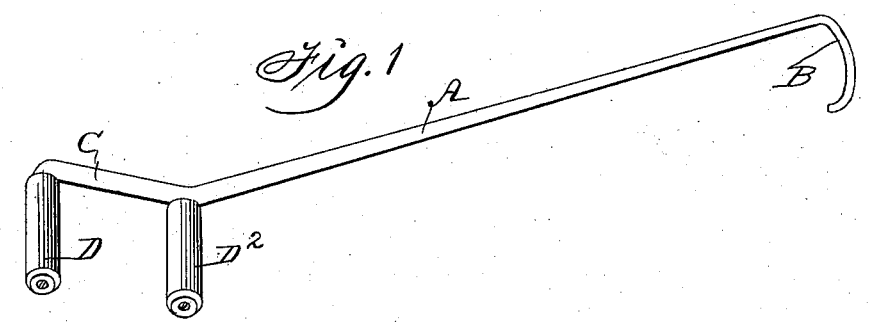
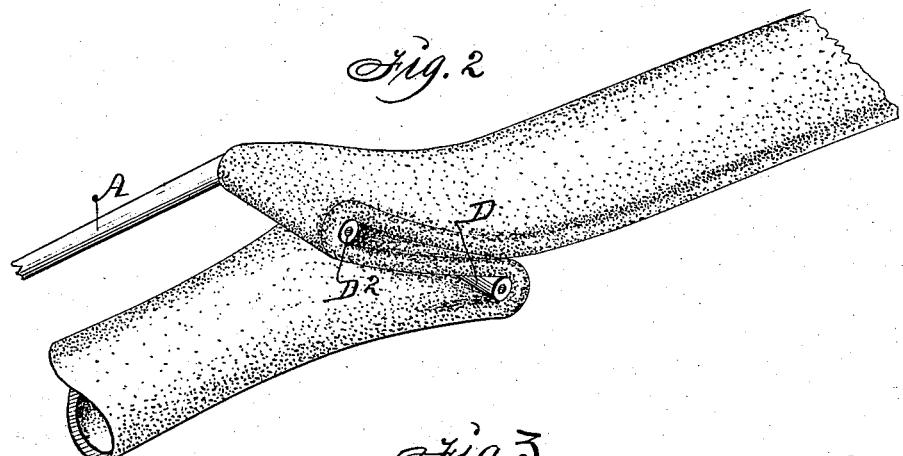
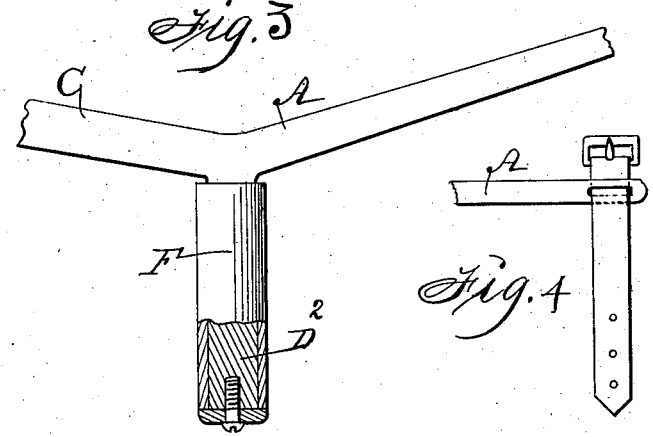
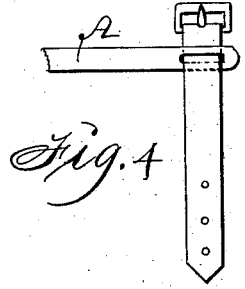

UNITED STATES PATENT OFFICE.

GEORGE E. McCLELLAND, OF DES MOINES, IOWA.

HOSE ATTACHMENT FOR STOPPING FLOW.

SPECIFICATION forming part of Letters Patent No. 662,955, dated December 4, 1900.

Application filed April 16, 1900. Serial No. 13,043. (No model.)

*To all whom it may concern:*

Be it known that I, GEORGE E. MCCLELLAND, a citizen of the United States, residing at Des Moines, in the county of Polk and State of Iowa, have invented a new and useful Hose Attachment for Stopping Flow at Any Point, of which the following is a specification.

When several hose are attached to a hydrant for throwing water to extinguish fire and one of the hose bursts, it has heretofore been necessary to cut off the flow from the water-main to the hydrant in order to disconnect the broken hose and replace it with a new one or a new section, and thus cause serious delay in throwing water on a fire.

My object is to provide means for cutting off the flow of water through a broken hose without detaching it from the hydrant or interrupting the use of the hydrant and other hose attached thereto and in place of allowing the pressure through the unbroken hose to be reduced by the escape of force and water through the leak in the broken hose to practically increase it by cutting off all force and water that might be wasted in escaping through the broken hose.

My invention consists in the device adapted to be readily applied and operated by hand to compress a hose as required to stop the flow of water therethrough and constructed as hereinafter set forth, pointed out in my claims, and illustrated in the accompanying drawings, in which—

Figure 1 is a perspective view of my device adapted to be applied to a hose. Fig. 2 is a perspective view showing my invention applied to a hose as required to cut off the passage of water through a hose. Fig. 3 is an enlarged detail view showing the manner of connecting rollers with the parts that are designed to double and clamp and close a hose. Fig. 4 is a detail view showing a loop at the end of the bar and a strap and buckle applied for detachably fastening the device to a hose.

The letter A designates a straight metal bar or lever that has a curved lateral extension B at one end, adapted to engage a hose, and an extension C at the other end, that projects at an angle and terminates in a right-angled clamp D. A corresponding clamp $D^2$ projects from the point where the parts A and C are united and in parallel position with the clamp D. Rollers F are preferably fastened on the mating projections or clamps, as shown in Fig. 3; but it is obvious that such rollers may be dispensed with, especially when my device is adapted in size to be applied to a one-inch garden-hose.

For hose such as are used for extinguishing fires the bar A is about two feet and six inches long and one inch in diameter, preferably tapering, as shown, and the lateral extensions are about five inches long.

In the practical use of my invention I place the clamps D and $D^2$ astride the hose at a point between the leak and the hydrant to which it is connected and then double the hose, as shown in Fig. 2, by simply reversing the position of the lever A and fastening its free end to the hose by means of the hook or a strap and buckle. The clamps will be thus retained in position and a length of the hose pressed flat thereby and doubled at two points, so that water cannot pass through while the broken section is being removed and a sound one put in its place without interrupting the action of one or more hose that may be attached to the same hydrant.

Having described the construction, purpose, and operation of my invention, its practical utility will be readily understood, and what I claim as new, and desire to secure by Letters Patent, is—

1. As a new article of manufacture, a hose attachment consisting of a straight lever having an inclined extension at one end and mating clamps projecting laterally from the ends of said inclined extensions and means at the other end of the lever for detachably fastening it to a hose in the manner set forth for the purposes stated.

2. A device for doubling and clamping flexible hose consisting of a straight lever having a hook extended at right angles from one end, an inclined extension at the other end and straight and mating lateral projections at the ends of said inclined extension and rollers on said lateral extensions, to operate in the manner set forth for the purposes stated.

GEORGE E. McCLELLAND.

Witnesses:
R. H. ORWIG,
THOMAS G. ORWIG.